US009825706B2

(12) United States Patent
Sobanski

(10) Patent No.: US 9,825,706 B2
(45) Date of Patent: Nov. 21, 2017

(54) SUPPORT SYSTEM FOR FIBER OPTIC COMPONENTS IN HARSH ENVIRONMENT MACHINES

(71) Applicant: United Technologies Corporation, Hartford, CT (US)

(72) Inventor: Kurt J. Sobanski, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 253 days.

(21) Appl. No.: 14/633,279

(22) Filed: Feb. 27, 2015

(65) Prior Publication Data

US 2015/0249499 A1 Sep. 3, 2015

Related U.S. Application Data

(60) Provisional application No. 61/946,076, filed on Feb. 28, 2014.

(51) Int. Cl.
*H04B 10/25* (2013.01)
*H04B 10/079* (2013.01)
(Continued)

(52) U.S. Cl.
CPC ......... *H04B 10/2504* (2013.01); *G01D 21/02* (2013.01); *G01M 15/14* (2013.01);
(Continued)

(58) Field of Classification Search
CPC .... G08C 23/06; G08C 15/00; H04B 10/2504; H04B 10/0791; G02B 6/4459;
(Continued)

(56) References Cited

U.S. PATENT DOCUMENTS 5,978,525 A * 11/1999 Shu ........................ F23D 14/725 385/12
6,078,714 A * 6/2000 Cavanaugh .......... G02B 6/4296 385/115

(Continued)

FOREIGN PATENT DOCUMENTS

EP 0493884 A1 7/1992
WO 2008/034028 A1 3/2008

OTHER PUBLICATIONS

European Search Report for EP Application No. EP15157189.0 dated Jul. 16, 2015.

(Continued)

*Primary Examiner* — Shi K Li
*Assistant Examiner* — Mina Shalaby
(74) *Attorney, Agent, or Firm* — Carlson, Gaskey & Olds, P.C.

(57) ABSTRACT

A multiplexed sensor system includes a control unit in communication with a plurality of sensors. A plurality of optic fibers defines a communication path between the plurality of sensors and the control unit. A multiplexing portion communicates with a plurality of sensors along a common one of the plurality of optic fibers and a protected channel through which at least a portion of the optic fibers are routed. The protected channel at least partially surrounds the optic fibers and shields the optic fibers from an environment outside the protected channel. A cooling flow is provided through the protective channel for minimizing temperature fluctuations within the protective channel. A method is also disclosed.

18 Claims, 5 Drawing Sheets

(51) Int. Cl.

| | |
|---|---|
| ***H04J 14/00*** | (2006.01) |
| ***G02B 6/44*** | (2006.01) |
| ***G01M 15/14*** | (2006.01) |
| ***G08C 23/06*** | (2006.01) |
| ***G01D 21/02*** | (2006.01) |
| ***G08C 15/00*** | (2006.01) |
| ***H04Q 9/00*** | (2006.01) |

(52) U.S. Cl.
CPC ........... *G02B 6/4459* (2013.01); *G08C 15/00* (2013.01); *G08C 23/06* (2013.01); *H04B 10/0791* (2013.01); *H04J 14/00* (2013.01); *H04Q 9/00* (2013.01); *H04Q 2209/30* (2013.01)

(58) Field of Classification Search
CPC ......... G01M 15/14; G01D 21/02; H04Q 9/00; H04Q 2209/30; H04J 14/00
See application file for complete search history.

(56) References Cited

U.S. PATENT DOCUMENTS

| | | | | |
|---|---|---|---|---|
| 6,647,209 | B1 | 11/2003 | Boord et al. | |
| 7,091,472 | B1 | 8/2006 | Millar | |
| 7,116,883 | B2 | 10/2006 | Kline et al. | |
| 7,184,633 | B2 | 2/2007 | Cooke et al. | |
| 7,317,813 | B2 | 1/2008 | Yanagawa et al. | |
| 8,155,490 | B2 | 4/2012 | de Jong et al. | |
| 8,280,209 | B2 | 10/2012 | Bollinger, Jr. et al. | |
| 8,761,559 | B1 | 6/2014 | Cody et al. | |
| 8,818,156 | B2 | 8/2014 | Navé | |
| 2003/0039437 | A1 | 2/2003 | Boord et al. | |
| 2006/0117759 | A1* | 6/2006 | Hall | E21B 47/011 62/3.2 |
| 2008/0066960 | A1* | 3/2008 | Mathiszik | E21B 47/01 175/41 |
| 2009/0266618 | A1* | 10/2009 | Mitchell | E21B 17/105 175/325.7 |
| 2013/0253735 | A1* | 9/2013 | Roy | B64D 31/00 701/3 |
| 2014/0046494 | A1* | 2/2014 | McAlister | G06F 1/26 700/287 |
| 2014/0180592 | A1* | 6/2014 | Ravi | E21B 47/101 702/12 |

OTHER PUBLICATIONS

Smart Fibres, Technology and Applications, www.smartfibres.com.
SmartScope Interrogator, For Fibre Bragg Grating Sensors, http://www.smartfibres.com/docs/SmartScope.pdf.
SmartCell, FBG Pressure and Temperature Sensors, http://smartfibres.com/docs/SmartCell.pdf.
SmartPort, Low Profile Fibre Optic P/T Gauge, For Permanent, Multi-Drop Downhole Deployment, http://smartfibres.com/docs/SmartPort.pdf.

* cited by examiner 141
117
64
142
74A 141
79A,79B
116
151
151
151
151
74A

SUPPORT SYSTEM FOR FIBER OPTIC COMPONENTS IN HARSH ENVIRONMENT MACHINES

CROSS REFERENCE TO RELATED APPLICATION

This application claims priority to U.S. Provisional Application No. 61/946,076 filed on Feb. 28, 2014.

BACKGROUND

Detailed knowledge of gas turbine engine and other machinery operation for control or health monitoring requires sensing systems that need information from locations that are sometimes difficult to access due to moving parts, internal operating environment or machine configuration. The access limitations make wire routing bulky, expensive and vulnerable to interconnect failures. The sensor and interconnect operating environments for desired sensor locations often exceed the capability of the interconnect systems. In some cases, cable cost, volume and weight exceed the allowable limits for practical applications.

Application of optic technologies for sensing systems has often been limited to dedicated fibers for specific sensors. In some instances, large and complex interrogating devices are employed to enable communication with sensors over optic fibers. Optic fiber communication devices for sensors have been limited to controlled environments and have not been utilized in harsh environments to multiplex dissimilar gas turbine sensors operating in extreme pressure and temperature environments.

SUMMARY

In one exemplary embodiment, a multiplexed sensor system includes a control unit in communication with a plurality of sensors. A plurality of optic fibers defines a communication path between the plurality of sensors and the control unit. A multiplexing portion communicates with a plurality of sensors along a common one of the plurality of optic fibers and a protected channel through which at least a portion of the optic fibers are routed. The protected channel at least partially surrounds the optic fibers and shields the optic fibers from an environment outside the protected channel. A cooling flow is provided through the protective channel for minimizing temperature fluctuations within the protective channel.

In a further embodiment of the above, includes a plurality of actuators in communication with the control unit through a power and data bus. At least one actuator is in communication with the control unit.

In a further embodiment of any of the above, the plurality of sensors include one of a speed sensor, a pressure sensor, a temperature sensor, a vibration sensor, a proximity sensor, an emissions sensor and a particle detection sensor.

In a further embodiment of any of the above, the protected channel includes a plurality of sections, with each section joined at an interface.

In a further embodiment of any of the above, the interface includes a key to mistake proof section assembly.

In a further embodiment of any of the above, the protected channel includes a seal for preventing intrusion of contaminants In a further embodiment of any of the above, the protected channel includes an opening that enables access to components contained therein.

In a further embodiment of any of the above, at least two of the plurality of optic fibers are in communication with a common one of the plurality of sensors.

In a further embodiment of any of the above, one of the plurality of sensors may be located outside the protected channel and is interconnected with the protected channel.

In a further embodiment of any of the above, includes an interrogator that automatically locates faults to enable fault accommodation and accurate troubleshooting.

In a further embodiment of any of the above, includes an interrogator adapted for adding and removing sensors without hardware changes.

In another exemplary embodiment, a multiplexed sensor system for a gas turbine engine includes a plurality of sensors mounted proximate a component of the gas turbine engine. A control unit is in communication with the plurality of sensors. A plurality of optic fibers defining a communication path between the plurality of sensors and the control unit. A multiplexing portion communicates with the plurality of sensors along a common one of the plurality of optic fibers, and a protected channel through which at least a portion of the plurality of optic fibers are routed. The protected channel at least partially surrounds the optic fibers and shields the optic fibers from an environment proximate the gas turbine engine. A cooling flow is provided through the protective channel for minimizing temperature fluctuations within the protective channel.

In a further embodiment of the above, including a plurality of actuators in communication with the control unit through a power and data bus. At least one actuator is in communication with the control unit.

In a further embodiment of any of the above, the component includes at least one of a fan section, a compressor section, a combustor section and a turbine section of the gas turbine engine.

In a further embodiment of any of the above, the plurality of optic fibers includes at least one optic fiber supported within the protected channel.

In another exemplary embodiment, a method of communicating information within a gas turbine engine includes routing a plurality of optic fibers between a corresponding plurality of sensors, the plurality of sensors generates signals indicative of a measured parameter of the gas turbine engine, routing of the plurality of optic fibers includes routing at least a portion of the plurality of optic fibers through a protected channel such that the protected channel at least partially surrounds the optic fibers and shields the optic fibers from an environmental outside the protected channel, and communicating the signals generated by the plurality of sensors over the plurality of optic fibers, communication includes multiplexing signals from the plurality of sensors such that signals generated by at least two different sensors are communicated over a common one of the plurality of optic fibers.

In a further embodiment of the above, includes communicating between a plurality of actuators in communication with the control unit through a power and data bus. At least two actuators are in communication with the control unit through a single power and data bus.

In a further embodiment of any of the above, the plurality of sensors include one of a speed sensor, a pressure sensor, a temperature sensor, a vibration sensor, a proximity sensor, an emissions and particle detection mounted proximate a component of the gas turbine engine.

Although the different examples have the specific components shown in the illustrations, embodiments of this disclosure are not limited to those particular combinations.

It is possible to use some of the components or features from one of the examples in combination with features or components from another one of the examples. In addition, examples provided show system configurations in single channel configurations. Actual systems implemented for aerospace application often contain additional identical channels for redundancy to enhance system reliability.

These and other features disclosed herein can be best understood from the following specification and drawings, the following of which is a brief description.

DETAILED DESCRIPTION

Figure 1:
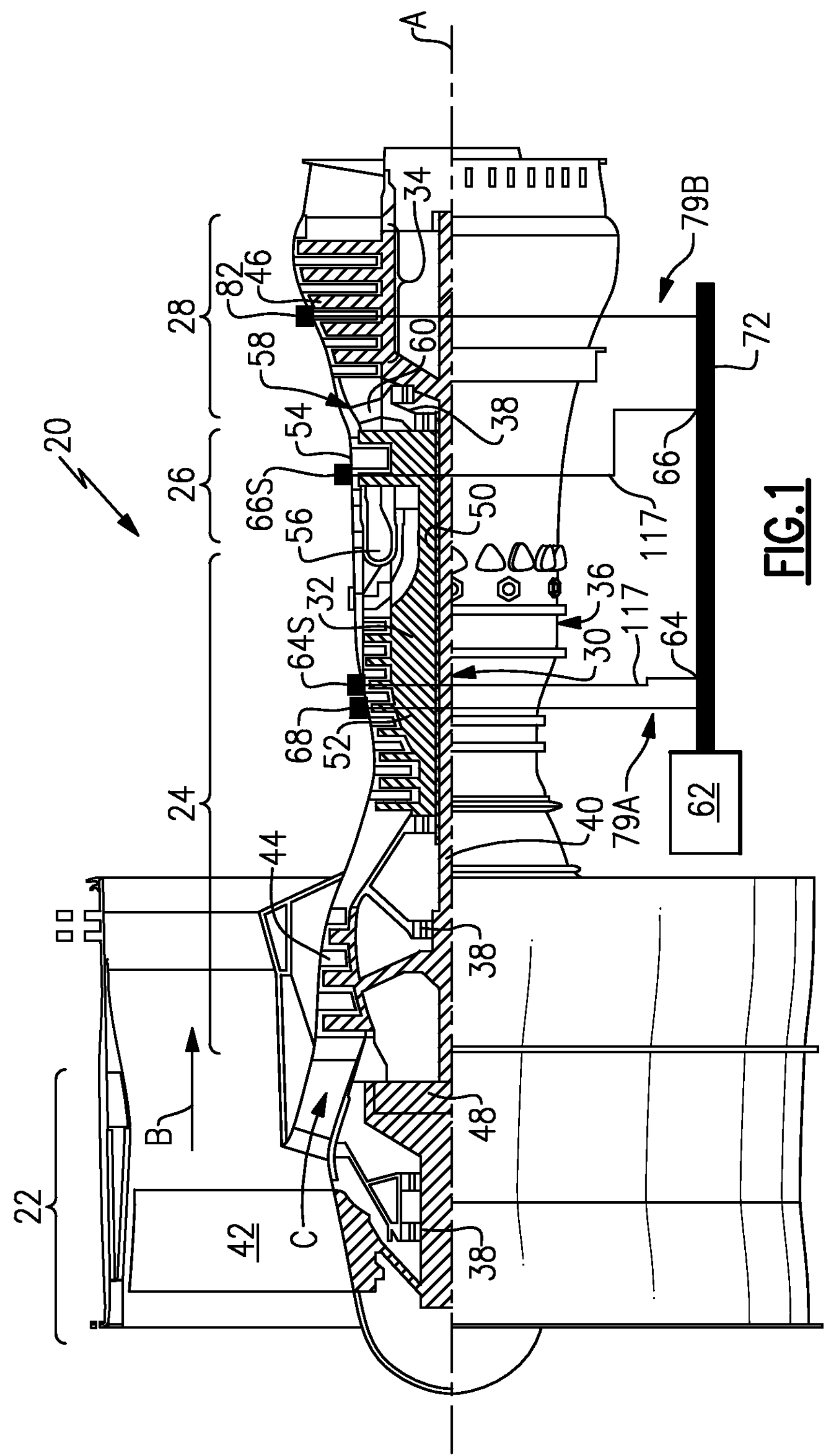
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The disclosed example gas turbine engine 20 includes a control and health monitoring unit (CHMU) 62 utilized to monitor and/or control performance and function of an actuator and/or gather information from various sensors. In this example the CHMU 62 is in communication with sensors 64, 66, 68 and 82 that provide information indicative of engine operating parameters. In this example the sensors 64 and 66 provide information indicative of pressure at locations 64*s* and 66*s* respectively and sensors 68 and 82, external to the protected channel, communicate information indicative of temperature and vibration over optic fibers 79A and 79B. The sensors 64 and 66 are linked to the corresponding location 64S and 66S through pneumatic or other mechanical connections 117. It should be noted that sensors 64 and 66 are contained within the protected channel 72 while the sensors 68 and 82 are external to the protected channel 72. As appreciated, other sensors communicating information relating to engine operating parameters, such as, for example speed, vibration, proximity, emission detection and particle detection are within the contemplation of this disclosure. The sensors 64, 66, 68 and 82 communicate with the CHMU 62 through optic fibers contained, at least partially, within the protected channel 72. The protected channel 72 is a ruggedized structure that partially surrounds the optic fibers to protect the optic fibers from the harsh environment of the gas turbine engine 20.

Prior control & diagnostic system architectures utilize a system in which sensor signal processing functions reside in an electronic control or monitoring module. These systems may use redundant components to accommodate failures and continue system operation. Actuator and sensor communication is accomplished through analog wiring for power, command, position feedback, sensor excitation and communication of sensor signals. Cables and connections require shielding to minimize effects caused by electromagnetic interference (EMI). The use of analog wiring and the required connections limit the capability of such systems by restricting weight and cost. These systems must be protected from harsh environments with extremes in temperature, pressure, and/or vibration.

Figure 2:
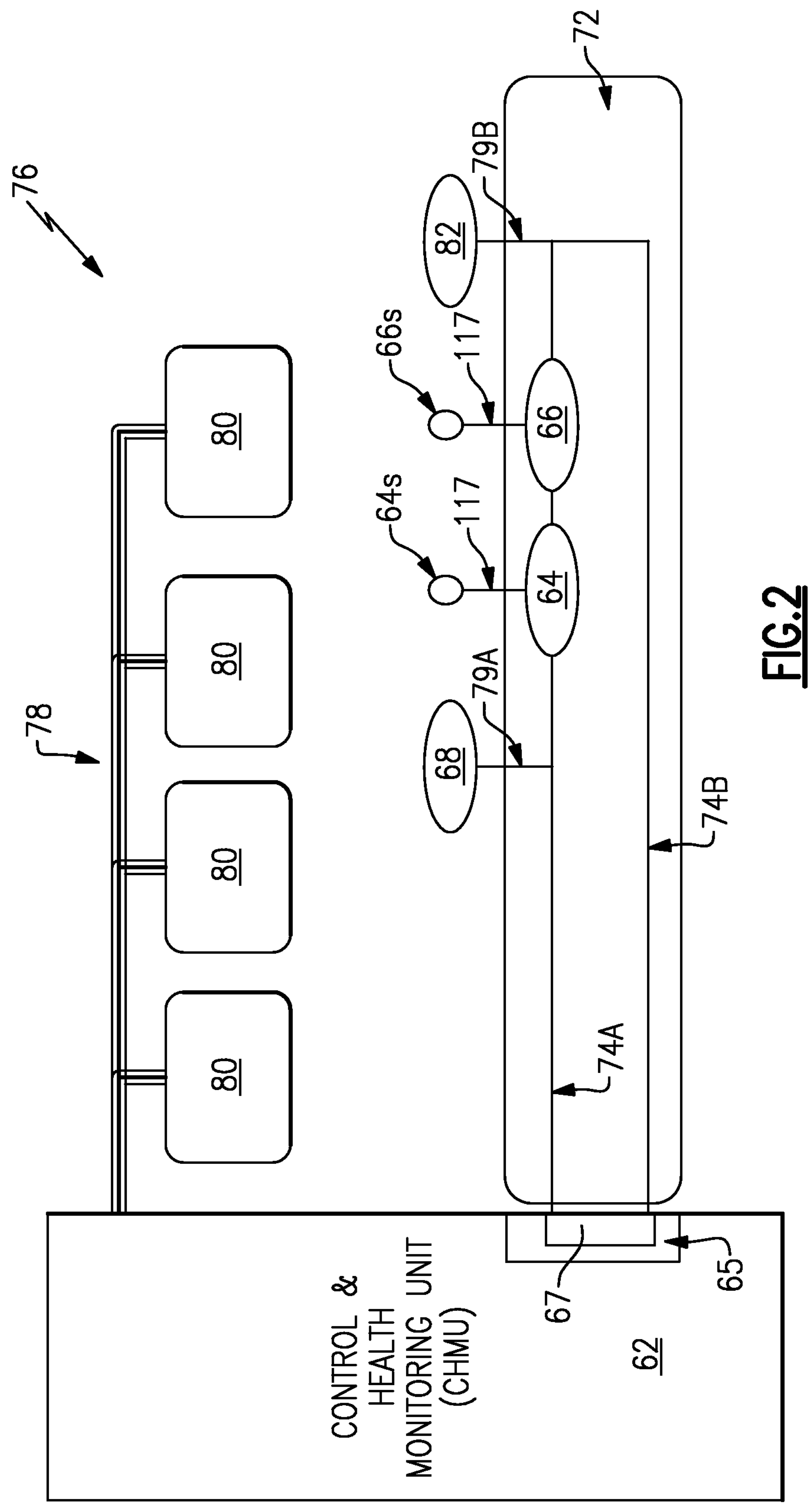
FIG. 2 is a schematic view of an example control and health monitoring system and sensor communication paths.

Referring to FIG. 2 with continued reference to FIG. 1, an example of a disclosed control and monitoring system 76 is schematically shown and includes a centralized system architecture in which the processing functions reside in the CHMU 62. The CHMU 62 is in communication with each of sensors 64, 66, 68 and 82 through an interrogator 65 and two (2) different and separate optic fiber sets 74A and 74B. Communication with each of the sensors 64, 66, 68 and 82 through each of the optic fiber sets 74A and 74B provides a desired redundancy to accommodate failures and enable continued system operation even with a failure in one of the optic fibers 74A and 74B. The example optic fiber sets 74A and 74B represent one channel of a system and may be replicated for redundancy in communication with redundant channels of a CHMU 62.

The disclosed system 76 may include actuators 80 that communicate and are powered through a power and data bus 78. The power and data bus 78 provides communication along analog wiring that provides power, command, position feedback, sensor excitation and sensor signals. Providing communication for the actuators 80 over the power and data bus 78 reduces the overall number of separate connections required to each for the actuators 80. Moreover, using the power and data bus 78 to communicate with actuators 80, where possible, eliminates the need for separate connections for sensors associated with each of the actuators.

The disclosed system 76 includes an interrogator 65 with a multiplexing portion 67 that multiplexes signals over optic fiber sets 74A and 74B such that multiple ones of the sensors 64, 66, 68 and 82 send signals over a common optic fiber set 74A and 74B. Multiplexing reduces the overall number of interrogators 65 and optic fibers required for any system. A single channel CHMU communication system is shown that may be duplicated to provide desired redundancy and enhanced system reliability. The CHMU 62 controls the system 76 and monitors health parameters through communication with the actuators 80 and sensors 64, 66, 68 and 82. The sensors 64, 66, 68 and 82 provide control feedback and/or diagnostic measures of system operation. The example sensors include the pressure sensors 64 and 66, temperature sensor 68, and an additional sensor 82 that may provide signals indicative of speed, vibration, proximity, emissions and/or particle detection. Moreover, although four (4) sensors are disclosed, the number, type and orientation of the sensors are tailored to application specific requirements.

The disclosed system 76 provides a multiplexed optic method for inputting sensor signals to the CHMU 62. The system 76 enables communication of multiple dissimilar signals on one optic fiber to the CHMU 62. The CHMU 62 includes an interrogator 65 with a multiplexer portion 67 for sending signals through the optic fibers 74A and 74B and de-multiplexing signals from the sensors 64, 66, 68, and 82. The interrogator 65 distinguishes between signals from the various different sensors 64, 66, 68, and 82. The CHMU 62 includes features that enable separation of environmental noise from the signal received form the sensors 64, 66, 68, and 82. The interrogator 65 automatically locates faults to enable fault accommodation and accurate troubleshooting. Further, the example interrogator 65 is adapted for adding and removing sensors without hardware changes.

Fault detection & accommodation is provided for redundant inputs of signals within the CHMU 62. The use of optic fiber for communication reduces system susceptibly to electromagnetic interference (EMI) and lightning thereby increasing signal reliability and requiring minimal connection interfaces for different sensors. Moreover, the disclosed system 76 is lighter and less expensive than comparable system utilizing wired connections due to the reduction in the number of cables and connection and the overall reduction in the number and types of different input channels. Additionally, the disclosed system can reuse CHMU designs for derivative systems with different sensors through the use of software changes to accommodate different input sensors. Furthermore, the limited number of connections and signal channels provides lower recurring maintenance costs.

The fiber connection and interrogation methodology enables fault detection along the fiber path to detect fiber degradation or connection problems. The fault detection ability provides for the interrogator to determine not only a presence of a fault, but also the location of the fault along the optic fiber.

Figure 3:
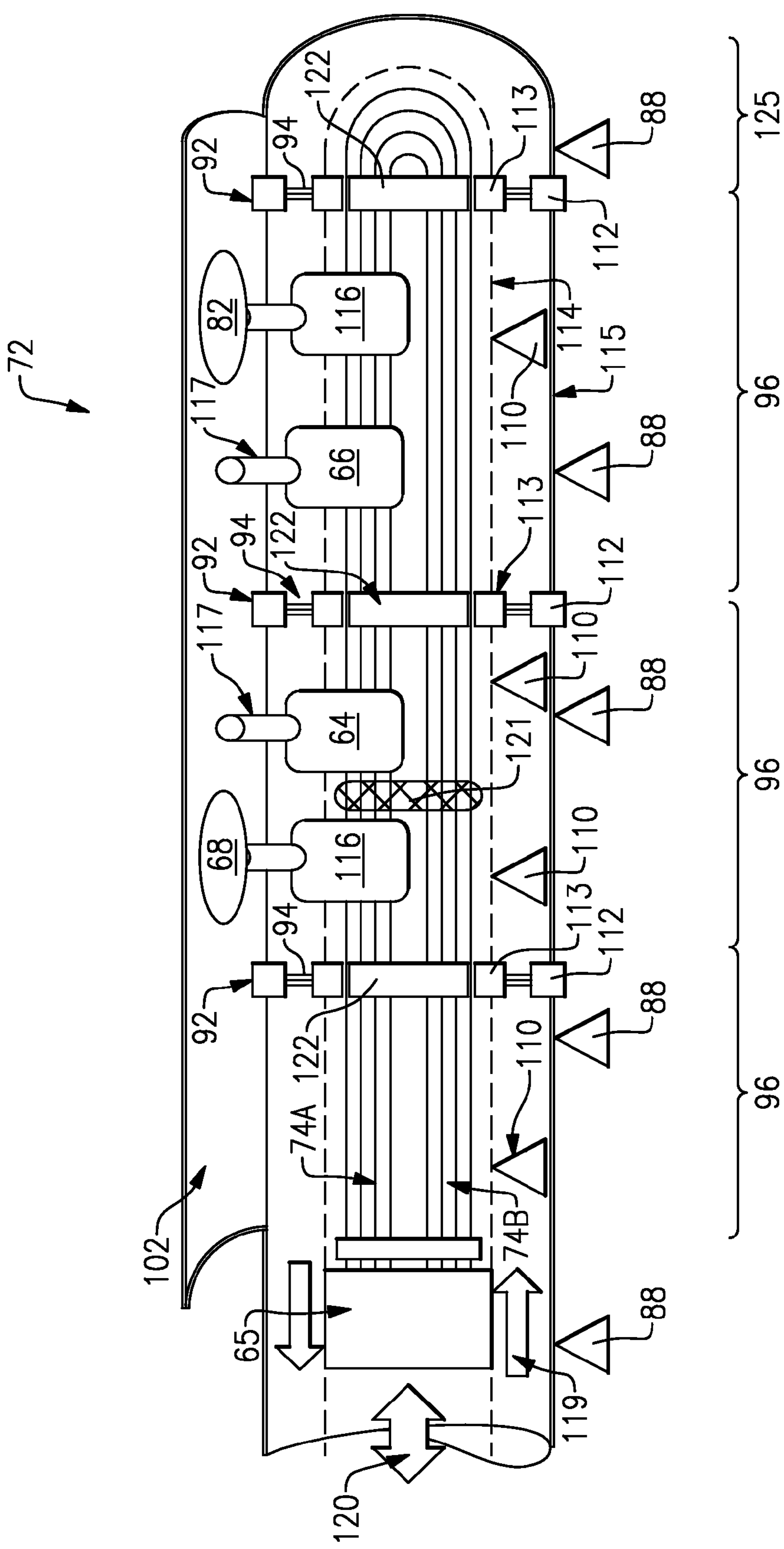
FIG. 3 is a schematic view of a protected channel for shielding optic fibers from environmental stresses.

Referring to FIG. 3, with continued reference to FIG. 2, the protected channel 72 provides optic fiber routing that is modular and sectioned to accommodate installation. The protected channel 72 protects optic fibers from thermal stress, limits contamination intrusion and accommodates vibration energy imparted to the channels and their mounting hardware.

The interrogator 65 may reside in the CHMU 62 or in the protected channel 72 and is connected to the CHMU over a digital interface 120. The protected channel 72 includes external supports 88 and internal supports 110 for the optic fibers 74A, 74B to protect against physical damage, environmental loads, vibration and thermal stress. The disclosed protected channels 72 are field serviceable and include one or more access panels 102 that may be opened to facilitate access to the optic fibers 74A, 74B to enable repair, replacement and/or additions. The protected channel 72 enables normal operation and service activities. The protected channel 72 may accommodate more fibers than are required such that additional optic fibers do not need to be routed in response to damage. The damaged fiber can be disconnected and the extra optic fiber connected at the terminal ends to provide the repair. Inclusion of an additional optic fiber enables equipment repair without removing the channel 72

The protected channel 72 may include thermal shielding 115 on an external surface to reduce radiative heating effects. The protected channel 72 may contain an inner sheath 114 with internal supports 110 and a path for 119 for cooling flow to provide thermal conditioning for the optic fibers 74A and 74B. The cooling flow is provided within the protective channel 72 to minimize temperature fluctuations of optic fibers within the protective channel 72. The cooling flow in this example is a cooling air flow however; other cooling flows could be utilized and are within the contemplation of this disclosure. The optic fibers 74A and 74B may be supported with a potting material 121 for vibration and thermal protection.

The disclosed protected channel 72 is modular and includes interconnecting sections 96. The interconnection sections 96 ease initial assembly and maintenance activities. Supports 88 are provided for the protected channel 72 to protect the optic fibers from physical damage, environmental loads, vibration and thermal stress.

Each of the modular sections 96 includes an interface 92 including support rail interfaces 112, inner rail interfaces 113 and fiber interconnects 122. The interface 92 provides a modular interconnect method and accommodates thermal expansion and contraction. The example interface 92 may include a key as part of the rail interfaces 112 that enables only a desired orientation between sections 96 to mistake proof assembly. The example interface 92 further includes a seal 94 that substantially prevents contamination from entering the protected channel 72.

A single end cap 125 may be provided to connect fibers 74A and 74B such that optic signals can be sent from the interrogator 65 into either path at the interrogator 65 source. The alternate signal paths provide redundant paths to a sensor to accommodate broken optic fibers or connections.

Auxiliary "sub-channels" within the protected channel may be provided to accommodate other items such as electrical, air or fluid channels. The protected channel approach can also include control signals, either in combination with the sensor signals or in a control only arrangement.

Figure 4:
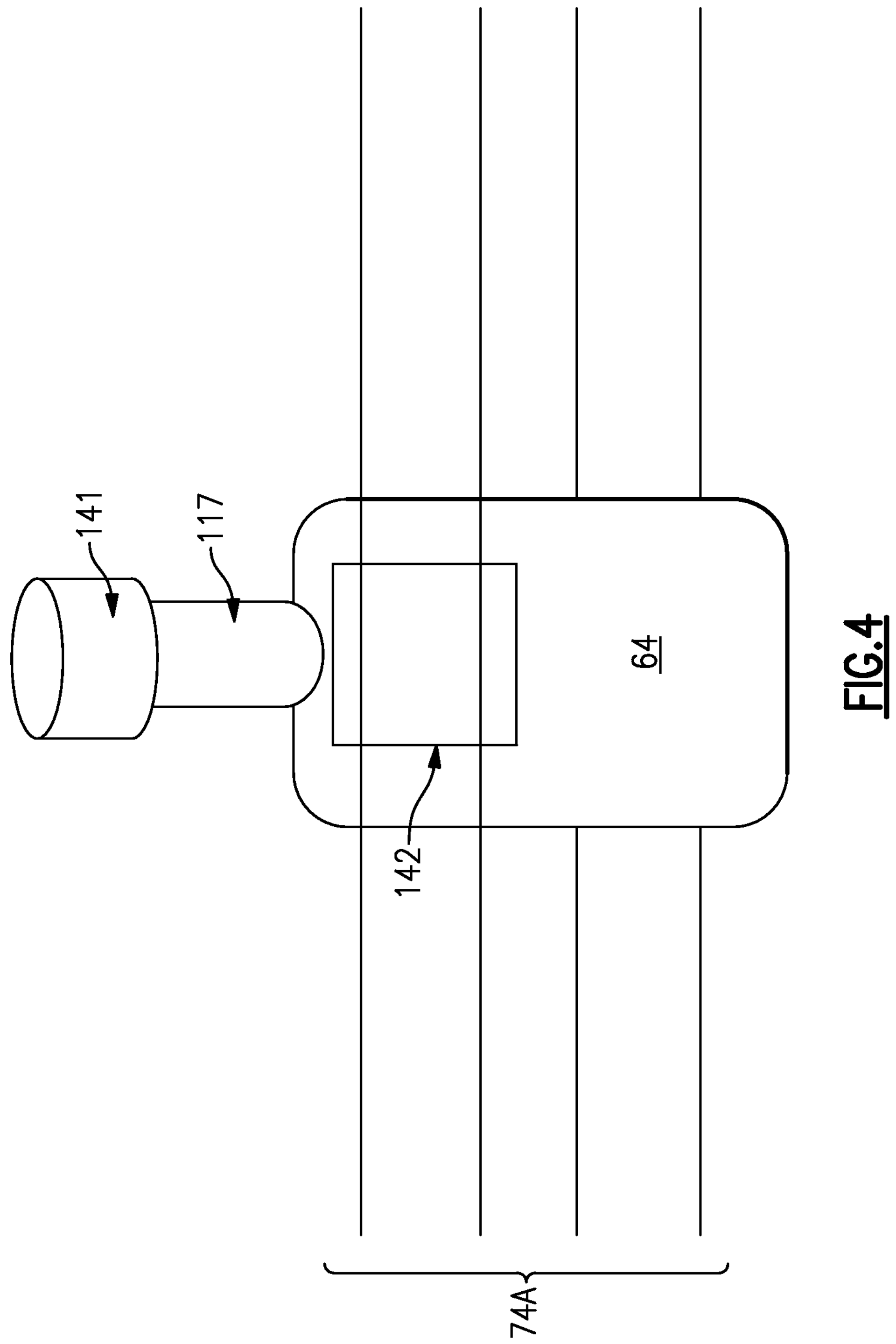
FIG. 4 is an example sensor and optic fiber connection within a protected channel that physically connects to an external pressure source.

Referring to FIG. 4, a sensor 64 may reside internally within the protected channel 72 (Best shown in FIGS. 2 and 3) and communicates through one or more optic fibers 74A. The sensor 64 includes a sensor element 142 that generates a signal indicative of sensed value for transmission to the CHMU 62 through the optic fibers 74A. A mechanical connection 117 through pneumatic or other mechanical means with a connector 141 enables sensing of engine or machine operating parameters in a location remote from the protected channel 72.

Figure 5:
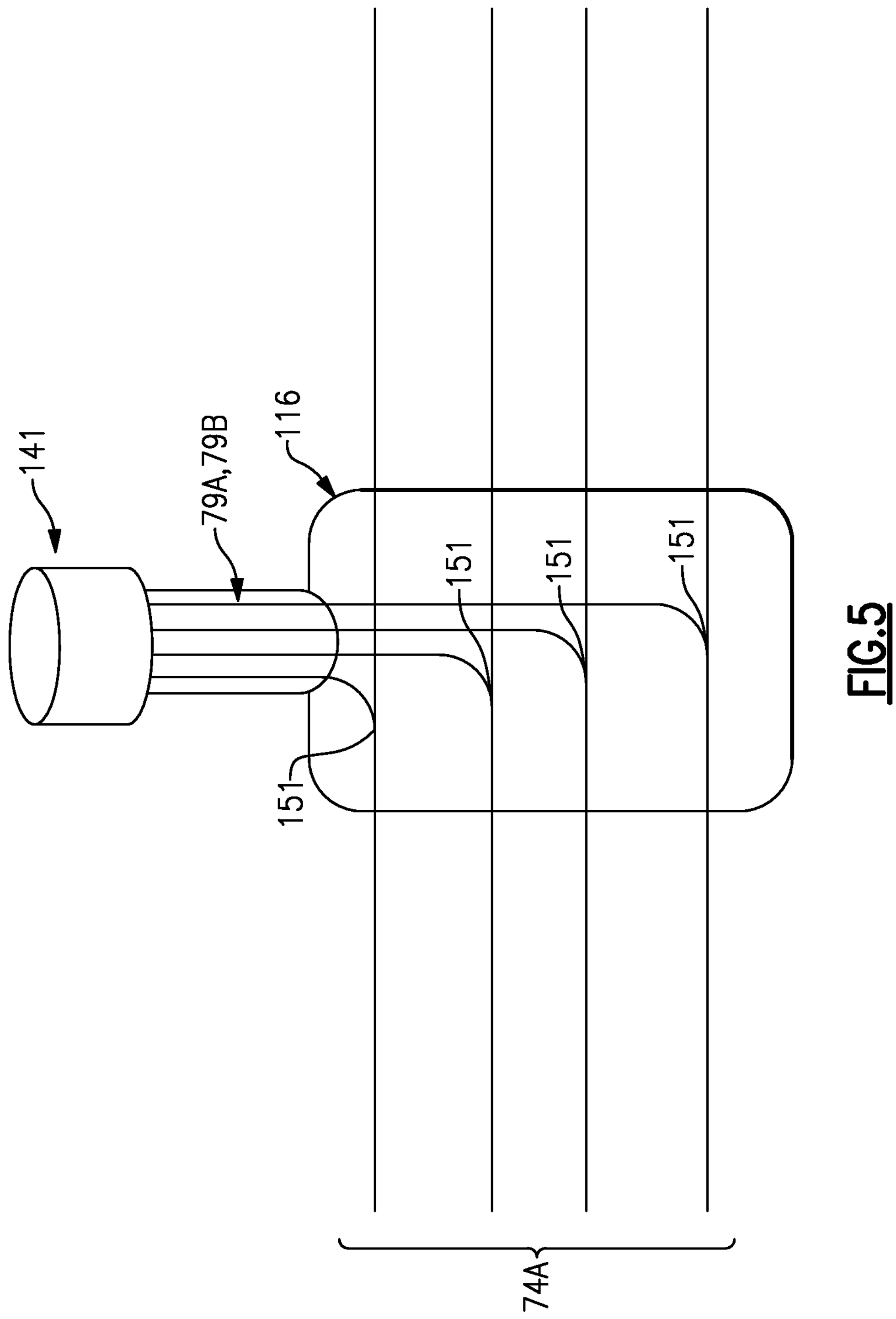
FIG. 5 is an example optic splitter configuration that routes fibers outside a protected channel for establishing a connection to an external sensor.

Referring to FIG. 5, a disclosed sensor splitter 116 enables a series of optical splitters 151 to be utilized to route optic fibers 74A outside the protected channel 72 for connection to an external sensor through an optic fiber cable 79A, 79B and the connector 141.

Although the following system has been disclosed with respect to control and diagnostic systems for a machine such as a gas turbine engine, it is within the contemplation of this disclosure to utilize this system for application to any equipment that utilizes sensors and actuators.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A multiplexed sensor system comprising:

a control unit in communication with a plurality of sensors;

a plurality of optic fibers defining a communication path between the plurality of sensors and the control unit;

a multiplexing portion for communicating with a plurality of sensors along a common one of the plurality of optic fibers;

a protected channel through which at least a portion of the optic fibers are routed, wherein the protected channel at least partially surrounds the optic fibers and shields the optic fibers from an environment outside the protected channel, wherein a cooling flow is provided through the protective channel for minimizing temperature fluctuations within the protective channel; and a plurality of actuators in communication with the control unit through a power and data bus, wherein at least one actuator is in communication with the control unit and the power and data bus is disposed outside the protected channel.

2. The multiplexed sensor system as recited in claim 1, wherein the plurality of sensors include one of a speed sensor, a pressure sensor, a temperature sensor, a vibration sensor, a proximity sensor, an emissions sensor and a particle detection sensor.

3. The multiplexed sensor system as recited in claim 1, wherein the protected channel comprises a plurality of sections, with each section joined at an interface.

4. The multiplexed sensor system as recited in claim 3, wherein the interface includes a key to mistake proof section assembly.

5. The multiplexed sensor system as recited in claim 3, wherein the protected channel comprises a seal for preventing intrusion of contaminants.

6. The multiplexed sensor system as recited in claim 1, wherein the protected channel includes an opening that enables access to components contained therein.

7. The multiplexed sensor system as recited in claim 1, wherein at least two of the plurality of optic fibers are in communication with a common one of the plurality of sensors.

8. The multiplexed sensor system as recited in claim 1, wherein one of the plurality of sensors may be located outside the protected channel and is interconnected with the protected channel.

9. The multiplexed sensor system as recited in claim 1, including an interrogator that automatically locates faults to enable fault accommodation and accurate troubleshooting.

10. The multiplexed sensor system as recited in claim 1, including an interrogator adapted for adding and removing sensors without hardware changes.

11. The multiplexed sensor system as recited in claim 1, including an end cap disposed at one end of the protected channel, the end cap connecting at least two of the plurality of optic fibers to define redundant communication paths to at least one of the plurality of sensors.

12. A multiplexed sensor system for a gas turbine engine comprising:

a plurality of sensors mounted proximate a component of the gas turbine engine;

a control unit in communication with the plurality of sensors;

a plurality of optic fibers defining a communication path between the plurality of sensors and the control unit;

a multiplexing portion for communicating with the plurality of sensors along a common one of the plurality of optic fibers;

a protected channel through which at least a portion of the plurality of optic fibers are routed, wherein the protected channel at least partially surrounds the optic fibers and shields the optic fibers from an environment proximate the gas turbine engine, wherein a cooling flow is provided through the protective channel for minimizing temperature fluctuations within the protective channel; and a plurality of actuators in communication with the control unit through a power and data bus, wherein at least one actuator is in communication with the control unit and the power and data bus is disposed outside of the protected channel.

13. The multiplexed sensor system as recited in claim 12, wherein the component comprises at least one of a fan section, a compressor section, a combustor section and a turbine section of the gas turbine engine.

14. The multiplexed sensor system as recited in claim 12, wherein the plurality of optic fibers includes at least one optic fiber supported within the protected channel.

15. The multiplexed sensor system as recited in claim 12, including an end cap disposed at one end of the protected channel, the end cap connecting at least two of the plurality of optic fibers to define redundant communication paths to at least one of the plurality of sensors.

16. A method of communicating information within a gas turbine engine comprising routing a plurality of optic fibers between a corresponding plurality of sensors, wherein the plurality of sensors generates signals indicative of a measured parameter of the gas turbine engine, wherein routing of the plurality of optic fibers includes routing at least a portion of the plurality of optic fibers through a protected channel such that the protected channel at least partially surrounds the optic fibers and shields the optic fibers from an environmental outside the protected channel;

communicating the signals generated by the plurality of sensors over the plurality of optic fibers, wherein communication comprises multiplexing signals from the plurality of sensors such that signals generated by at least two different sensors are communicated over a common one of the plurality of optic fibers; and communicating between a plurality of actuators in communication with the control unit through a power and data bus disposed outside the protected channel, wherein at least two actuators are in communication with the control unit through a single power and data bus.

17. The method as recited in claim 16, wherein the plurality of sensors include one of a speed sensor, a pressure sensor, a temperature sensor, a vibration sensor, a proximity sensor, an emissions and particle detection mounted proximate a component of the gas turbine engine.

18. The method as recited in claim 16, assembling an end cap at one end of the protected channel and connecting at least two of the plurality of optic fibers to define redundant communication paths to at least one of the plurality of sensors.

* * * * *